United States Patent [19]
Lucker et al.

[11] Patent Number: 5,307,593
[45] Date of Patent: May 3, 1994

[54] METHOD OF TEXTURING RIGID MEMORY DISKS USING AN ABRASIVE ARTICLE

[75] Inventors: James A. Lucker, Alameda, Calif.; Darlene N. Strecker; Kathleen A. Wagle, both of Oakdale, Minn.

[73] Assignee: Minnesota Mining and Manufacturing Company, St. Paul, Minn.

[21] Appl. No.: 938,416

[22] Filed: Aug. 31, 1992

[51] Int. Cl.$^5$ .............................................. B24B 29/00
[52] U.S. Cl. .................... 51/281 SF; 51/137; 51/145 R; 51/398; 51/407
[58] Field of Search ............... 51/281 R, 328, 135 R, 51/137, 144, 281 SF, 145 R, 398, 407

[56] References Cited

U.S. PATENT DOCUMENTS

| | | | |
|---|---|---|---|
| 4,189,395 | 2/1980 | Bland | 51/295 |
| 4,475,981 | 10/1984 | Rea | 51/317 |
| 4,486,200 | 12/1984 | Heyer | 51/295 |
| 4,762,534 | 8/1988 | Ito et al. | 51/293 |
| 4,843,678 | 6/1989 | Noro et al. | 156/636 |
| 4,974,373 | 12/1990 | Kawashima et al. | 51/295 |
| 4,983,421 | 1/1991 | Mochixaki et al. | 427/130 |
| 5,088,240 | 2/1992 | Ruble et al. | 51/165 |
| 5,099,615 | 3/1992 | Ruble et al. | 51/165 |

FOREIGN PATENT DOCUMENTS

| | | | |
|---|---|---|---|
| 619605 | 5/1961 | Canada | 51/357 |
| 453851 | 9/1936 | United Kingdom | 51/357 |

OTHER PUBLICATIONS

Mipox New Texturing Tape Sep. 1991, Mipox.
MIPOX International Corporation New Product Announcement: MITEX, dated Jun. 12, 1992, 32 pages.
"The dependence of stiction and friction on roughness in thin-film magnetic recording disks", Raman et al., *J. Appl. Phys.*, vol. 70, No. 3, Apr. 26, 1991, pp. 1826–1836.
"Finesse-it ™ Plastic System-For repairing and polishing of plastic", 3M Company, St. Paul, Minn. dated Mar. 1992, 6 pages.
"Imperial ™ Lapping Film-for a precision finish", 3M Company, St. Paul, Minn. dated 1991, 2 pages.

*Primary Examiner*—Jack Lavinder
*Attorney, Agent, or Firm*—Gary L. Griswold; Walter N. Kirn; Gregory D. Allen

[57] ABSTRACT

A method for texturing magnetic recording media substrates which have a thin-film metal or metal alloy coating plated onto a substrate using an abrasive composite bonded to a porous backing.

18 Claims, 4 Drawing Sheets

METHOD OF TEXTURING RIGID MEMORY DISKS USING AN ABRASIVE ARTICLE

FIELD OF THE INVENTION

This invention relates to a method of texturing magnetic media substrates having a thin-film metal or metal alloy coating using an abrasive composite bonded to a porous backing.

BACKGROUND OF THE INVENTION

Personal computers have become commonplace and many personal computers contain a rigid memory disk or hard drive. A very popular type of hard drive contains a thin-film metal coated rigid disk as the substrate of the magnetic media. The thin film rigid disks are typically manufactured by electroless nickel plating an aluminum substrate with a metal or metal alloy coating such as nickel/phosphorus. The nickel/phosphorus coating is then polished to a very fine, mirror-like finish. After polishing, the nickel/phosphorus coating is textured, followed by the application of a magnetic coating.

The texturing portion of this process is critical to the performance of the rigid disks. The texturing process preferably results in a random pattern of scratches with sharply defined edges in a substantially circumferential direction relative to the center of the rigid disk.

Texturing accomplishes a number of purposes It improves the aerodynamics between the computer head (which reads and writes data on the disk) and the thin film rigid disk as the disk spins beneath the head. It also improves the magnetic properties of the coated disks. The scratches formed during texturing make it easier for the head to distinguish bytes of information between tracks on the disk. If the scratches are too wide or too deep, however, there may be a potential loss of data off of the rigid disk. The texturing also eases the separation between the computer head and the rigid disk when the computer is first turned on. When the computer is turned off, the rigid disk and computer head are in contact with each other. When the computer is turned on, the rigid disk will begin to spin. If the disk is smooth and not textured, this head/disk contact makes it difficult for the disk to start spinning. This is known in the computer industry as stiction/friction.

The texturing process is traditionally accomplished by using a loose abrasive slurry. The loose abrasive slurries do provide substantially circumferential scratches that have sharply defined edges and are of the required depth. Loose abrasive slurries are, however, accompanied by a number of disadvantages. First, the loose abrasive slurries create a large amount of debris and waste. As a result, the thin film rigid disks must be thoroughly cleaned to remove any residue left on their surface from the abrasive slurry The loose abrasive slurry also results in a relatively high amount of wear on the equipment used for texturing.

To overcome the disadvantages associated with loose abrasive slurries, coated abrasive lapping films have been used to texture the thin film rigid disks. An example of such a product is IMPERIAL TM Lapping Film (Type R3) commercially available from 3M Company, St. Paul, Minn. This lapping film comprises a polymeric film backing having an abrasive coating bonded thereto. The abrasive coating consists of very fine abrasive particles (average particle size is less than 10 $\mu$m) dispersed through a binder on the polymeric film. During use, the lapping film abrades a portion of the metal coating, thereby texturing the coating.

This process may also include disadvantages. The portion of the metal or metal alloy coating abraded away during texturing is known in the industry as swarf. The swarf generated during the use of lapping films and other abrasive articles with sealed backings can become attached to the high spots on the textured metal or metal alloy coating. That particular phenomenon is known in the industry as reweld. Those high spots can be hit by the computer head during use, which can cause a loss of data and/or head damage.

In addition to the problems with reweld, the lapping film may not provide scratches having edges as sharp and/or clean as those produced by the loose abrasive slurries. Those lower quality scratch edges may degrade the quality of the disks manufactured using lapping film for the texturing process.

Lapping films with polymeric film backings and porous nonwoven materials have both been used to polish magnetic media after the magnetic coatings have been applied. In contrast, the texturing process described above is performed before the magnetic coatings are applied to prepare the substrates to receive the magnetic coatings. The polishing minimizes the surface roughness of the magnetic coatings on the disks to allow for closer spacing of the computer head to the magnetic media. U.S. Pat. No. 4,762,534 discloses a method of polishing magnetic media using abrasive particles dispersed on a polymeric film, with voids between the abrasive particles to allow for removal of the magnetic oxides loosened during polishing. U.S. Pat. No. 4,983,421 discloses the use of a nonwoven material to polish the surface of metal thin-film type magnetic media. The nonwoven is used to buff the thin-film magnetic coating to reduce drop-outs and other errors in the magnetic coating.

Porous abrasive articles have also been used to polish magnetic oxide coated rigid memory disks. In that process, an abrasive article with a nonwoven backing and an abrasive composite is used to polish the surface of a rigid disk that has been coated with a magnetic oxide/resin composite. This polishing has, however, been used only to remove high spots in the magnetic oxide/resin composite to prevent the computer head from striking such high points.

To date, there has not been a method to uniformly texture thin film metal or metal alloy coated rigid disks before the application of the magnetic coatings in a clean process that generates high quality scratches and avoids the problem of reweld.

SUMMARY OF THE INVENTION

The method of the present invention solves the disadvantages associated with the use of both loose abrasive slurries and lapping film to texture thin-film metal coated rigid magnetic media substrates before the magnetic coatings are applied. In particular, the large amount of debris created by loose abrasive slurries and the resulting difficult cleaning process are eliminated by using the method of the present invention. The high rate of equipment wear associated with the loose abrasive slurries is also avoided.

The problem of reweld, particularly troublesome when lapping tape is used, is also avoided by use of the present invention. It is theorized that the porous nature of the backing and discontinuous coating of the abrasive composite on the backing allow it to absorb the swarf and move it away from the abrading interface. As a result, the swarf is not redeposited on the substrate, where it can form high points that cause disk or head failures.

Removing the swarf during the abrading process also results in a more uniformly abraded surface with cleaner, sharper scratches, similar to those provided with loose abrasive slurries, but without the debris associated with that method.

The method of the present invention comprises the steps of:

a) providing a rigid substrate having a metal coating on a surface of the rigid substrate;

b) providing a porous abrasive article in frictional contact with the metal coating, the porous abrasive article comprising an abrasive composite bonded to a porous backing, the abrasive composite further comprising a plurality of abrasive particles distributed in a binder; and c) abrading the metal coating with the porous abrasive article to form scratches in the metal coating.

DETAILED DESCRIPTION OF THE INVENTION

The present invention provides a method of texturing thin-film metal or metal alloy coated substrates used for magnetic media disks before the application of the magnetic coatings in a clean process that generates high quality scratches and avoids the problem of reweld associated with lapping films.

The typical process of texturing a magnetic media disk substrate using the method of the present invention includes providing a rigid substrate that has a thickness between 0.75 to 1.25 millimeter. The substrate can be made from any rigid material, but is typically a metal, metal alloy or ceramic material. A typical substrate material is an aluminum alloy.

Figure 1:
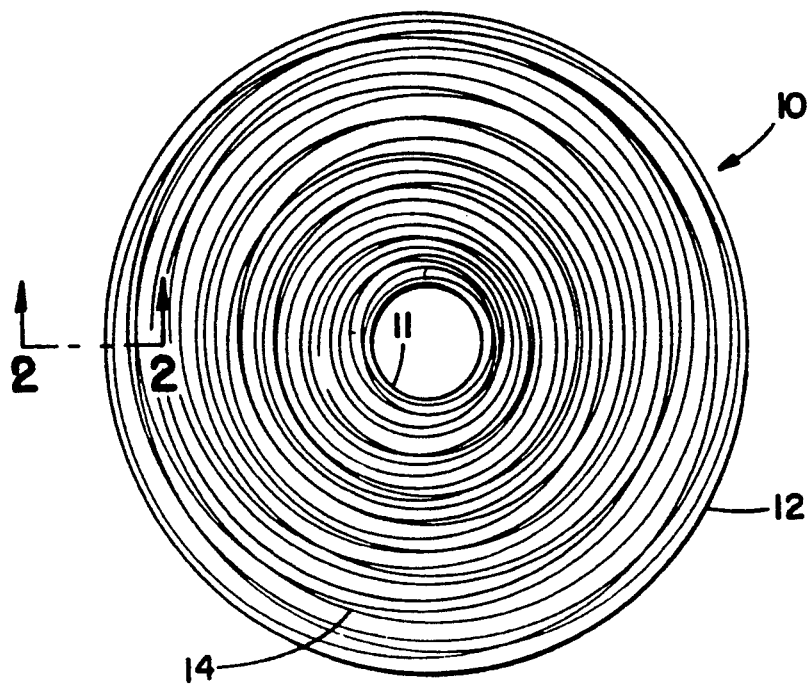
FIG. 1 is a top view of a thin-film metal coated rigid disk substrate textured according to the method of the present invention.

Referring to FIG. 1, the rigid disk 10 is generally circular in shape with center hole 11. A thin-film metal or metal alloy coating is applied over at least one surface 12 of the substrate 10. The coating is typically applied to both major surfaces of the disk.

For the purposes of the present invention, the thin-film coating will be referred to as "metal" but will be understood to include metal or metal alloys. The preferred metal coating does not contain any appreciable amounts of metal oxides, i.e., the amount of metal oxides by weight are typically less than 0.01%. The metal is typically applied by electroless nickel plating, although other coating techniques may be employed. The metal coating thickness is generally between 5 to 20 µm, usually about 15 µm.

The preferred nickel coating includes phosphorous to prevent the nickel from having magnetic properties. The preferred coating typically contains from about 5 to 20% phosphorus, usually about 12% phosphorus.

After coating, the disk surface 12 is polished to a very fine finish, usually by a conventional loose abrasive slurry. Loose abrasive slurries comprise a plurality of abrasive particles (typically having an average particle size less than 5 µm) dispersed in a liquid medium, such as water or an organic solvent.

After polishing with the loose abrasive slurry, the surface finish of the metal coating has a very random scratch pattern or orientation.

The arithmetic average of all distances from the centerline of the roughness profile of the surface of the polished metal coating preferably has a value of less than 0.0020 µm. That surface finish value is referred to herein as Ra, and is also known as Center Line Average. As referred to in connection with the present invention, Ra is measured using a Wyko TOPO-3D Interferometer (purchased from Wyko Corp. Tucson, Ariz.) with a 40× objective lens. It will be understood that other methods of measuring Ra could be used in connection with the method of the present invention, with appropriate adjustments to the preferred values of Ra as discussed herein.

After polishing, the metal coating on surface 12 is ready to be textured according to the method of the present invention. Texturing of the metal coating on the surface 12 results in a random pattern of scratches 14 in a substantially circumferential direction relative to the center of the rigid disk 10. The scratches are preferably not concentric with the center of the rigid disk 10, but are preferably substantially circumferential, producing scratches that randomly cross each other.

Figure 2:
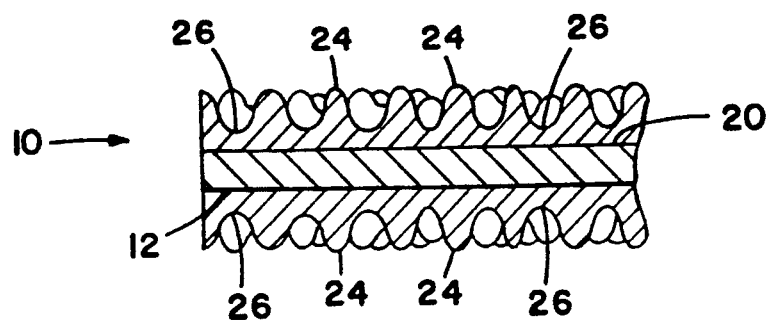
FIG. 2 is a cross-sectional view of a thin-film metal coated rigid disk substrate taken along 2—2 of FIG. 1.

Referring now to the partial cross-sectional view of FIG. 2, the disk 10 comprises substrate 12 with a textured metal coating 20 formed on both surfaces, although it will be understood that the coating could be present on only one surface. Scratches 14 are irregular in nature and comprise high regions 24 and low regions 26. The Ra of the scratches 14 is preferably between about 0.0030 to about 0.0070 µm preferably 0.0035 to 0.0055 µm. The width and height of the scratches 14 do not have to be uniform, although the scratches should not be excessively wide or deep.

The texturing process results in an increase in the exposed surface area of the metal coating 27. The rougher surface reduces stiction/friction with the computer head and substantially circumferential direction of the scratches enables better differentiation between data tracks.

Figure 3:
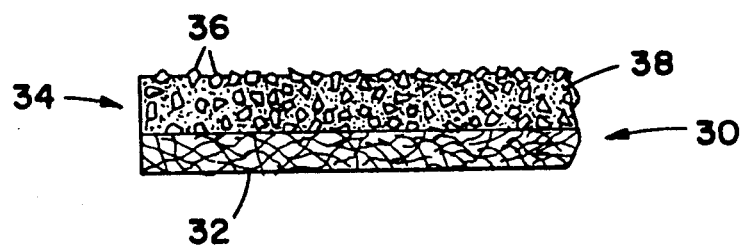
FIG. 3. is a cross-sectional view of one embodiment of the abrasive article for use in the method of the present invention.

Referring to FIG. 3, a coated abrasive article 30 used in the method of the present invention includes a porous backing 32 and an abrasive composite 34 bonded to the backing, wherein the abrasive composite comprises a plurality of abrasive particles 36 distributed in a binder 38.

The porous nature of the backing 32 is important to proper functioning of the invention. It is theorized that due to the porosity of the backing 32 and the preferred wet environment of the texturing process (described in more detail below), the swarf from the texturing penetrates into the backing 32 and is removed from the abrading interface between the abrasive article 30 and the metal coating (not shown).

If the swarf is not removed from the abrading interface (as when lapping film with a sealed polymeric film backing is used to perform the texturing) it can be deposited on the high regions 24 of the scratches 14 in the textured metal coating 20 (see FIG. 2). This phenomena can lead to interference between the rigid disk and the computer head which can potentially lead to a crash of the computer head. Furthermore, removal of the swarf also appears to produce scratches with sharper, cleaner edges—as with the loose abrasive slurries, but without the disadvantages associated with them.

A porous backing is not completely sealed across its width and/or length. To determine whether a backing is porous or sealed for the purpose of the present invention, a porosity test that is well known in the textile industry is performed.

The porosity test is performed using a Gurley Densitometer. A sample of the backing (before application of the abrasive composite) is secured at one end of a hollow metal cylinder of the densitometer. A piston that fits very tightly within the cylinder is then raised to allow exactly 100 cubic centimeters of air at room temperature and pressure into the space between the backing and piston. A timer is started at the exact moment when the piston begins to fall by the force of gravity toward the backing. The time required for the 100 cubic centimeters of air to pass through the backing is measured. If the time is less than 100 seconds the backing is considered porous for the purposes of the present invention. The time for the air to pass through a preferred sample is less than 50 seconds.

The preferred porous backing 32 is a nonwoven material. A nonwoven can be described as a matrix of a randomly distributed of fibers. This matrix is usually formed by bonding the fibers together either autogeneously, or by an adhesive. Examples of nonwoven material forms suitable for this invention include those of fibers which are staple-bonded, spun-bonded, meltblown, wet laid, needle-punched or thermo-bonded. A nonwoven is typically porous, having a void volume of about 15% or more. Nonwovens are further described in "The Nonwoven Handbook" edited by Bernard M. Lichstein, published by the Association of the Nonwoven Fabrics Industry, New York, 1988, which is hereby incorporated by reference.

The fibers in the nonwoven can be natural or synthetic. Examples of fibers include: glass fibers, carbon fibers, mineral fibers, organic fibers or ceramic fibers. The organic fibers can be natural or synthetic. Examples of typical synthetic fibers include polyvinyl alcohol fibers, rayon, polyethylene, polypropylene, nylon fibers, polyester fibers, phenolic fibers and aramid fibers. Examples of natural fibers include cellulose, hemp, kapok, flax, sisal, jute, manila and combinations thereof.

The preferred fibers for the porous backing of the present invention are synthetic fibers.

Because the size of the abrasive particles used in the present invention is relatively small, i.e., less than 25 $\mu$m in average diameter, it is preferred that the fiber in the nonwoven backing also be relatively fine. The average fiber diameter is preferably less than about 30 $\mu$m, most preferably less than 20 $\mu$m.

The thickness of the nonwoven generally ranges from 25 to 800 $\mu$m, preferably between 100 to 375 $\mu$m. The weight of the nonwoven generally ranges from 7 to 150 grams/square meter, preferably between 17 to 70 grams/square meter.

It is within the scope of this invention to have only one layer of the nonwoven or to have multiple nonwoven layers forming the backing. These multiple layers can range from 1 to 10 nonwoven layers, preferably between 2 to 5 nonwoven layers.

The preferred nonwoven backing may also contain an adhesive to help bond the fibers together. The amount of the adhesive should not, however, be so high that the backing is sealed as determined by the porosity test described above. Examples of useful adhesives include resin emulsions like acrylonitrile butadiene emulsions, acrylic emulsions, butadiene emulsions, butadiene styrene emulsions, and combinations thereof. Other useful adhesives include thermosetting resins like phenolic resins, acrylate resins, epoxy resins, urea-formaldehyde resins, urethane resins, and combinations thereof.

The porous backing of the invention may additionally comprise other additives that are well known in the art such as toughening materials, shape stabilizers, fillers, dyes, pigments, wetting agents, surfactants, coupling agents, antistatic agents, oils, flame retardants, ultraviolet stabilizers, internal lubricants, antioxidants and processing aids.

The abrasive particles in the abrasive composite used in the method of the present invention typically have an average size ranging from about 0.1 to 10 $\mu$m, usually between about 0.1 to 4 $\mu$m and preferably between 0.1 to 3 $\mu$m. This preferred range is found to be most beneficial in generating an Ra value of between about 0.0030 to about 0.0070 $\mu$m. If the abrasive particle size is too large, then the resulting Ra value may be too large, i.e., greater than about 0.0070 $\mu$m. If the abrasive particle size is too small, then the resulting Ra value may be too small, i.e., less than about 0.0030 $\mu$m. It is also preferred that the abrasive particle size distribution be very tightly controlled to minimize the amount of undesirable scratches.

The abrasive particles preferably have a MOH hardness of at least about 8, more preferably above 9. Examples of such abrasive particles include fused aluminum oxide, ceramic aluminum oxide, white fused aluminum oxide, heat-treated aluminum oxide, gamma aluminum oxide, chrome oxide, silicon carbide, alumina zirconia, diamond, ceria, cubic boron nitride, garnet and combinations thereof.

As used in relation to the present invention, the term abrasive particles also encompasses abrasive agglomerates, i.e., single abrasive particles bonded together prior to forming the abrasive composite used in the method of the present invention. Abrasive agglomerates are further described in U.S. Pat. Nos. 3,916,584; 4,311,489 and 4,652,275, all of which are incorporated herein by reference.

The abrasive slurry used to form the abrasive composite includes a binder precursor. Examples of possible binder precursors include phenolic resins, aminoplast resins, urethane resins, epoxy resins, ethylenically unsaturated resins, acrylated isocyanurate resins, urea-formaldehyde resins, isocyanurate resins, polyester resins, acrylated urethane resins, acrylated epoxy resins, bismaleimide resins, fluorene modified epoxy resins and mixtures thereof. Depending upon the particular resin, the binder precursor may further include a catalyst or curing agent. The catalyst and/or curing agent will either help initiate and/or accelerate the polymerization process.

The binder precursor is typically in a liquid state or an uncured or non-polymerized state. A preferred binder precursor is a polyester resin, such as a linear saturated polyester resin. Examples of such polyester resins are VITEL TM resins commercially available from Goodyear, Akron, Ohio. The polyester resin may also be combined with a diisocyanate resin to crosslink the polyester resin.

The abrasive slurry can further comprise optional additives, such as, for example, fillers (including grinding aids), fibers, lubricants, wetting agents, surfactants, pigments, organic solvents, water, dyes, coupling agents, plasticizers and suspending agents. The amounts of these materials can be selected to provide the desired properties.

After the abrasive slurry is coated onto the porous backing, the binder precursor is solidified to form the abrasive composite. This solidification can be accomplished by a drying and/or polymerization process. Polymerization or curing is typically accomplished by exposing the abrasive slurry to an energy source such as thermal energy or radiation energy like an electron beam, ultraviolet light or visible light. After the binder precursor is solidified, it is converted into a binder, thus converting the abrasive slurry into an abrasive composite.

The preferred binder has a Knoop hardness less than about 50, preferably less than 20. This results in the coated abrasive leaving a fine finish between the scratches in the thin-film metal coating.

The gravimetric ratio of the abrasive particles to binder in the abrasive composite is between 5:1 to 1:1, preferably 3:1 to 2:1.

A preferred coated abrasive article used in the method of the present invention can be made by the following method. The abrasive slurry is prepared by mixing together abrasive particles, the binder precursor and optional additives. The preferred mixing technique is a ball mill mixer with glass media to prevent agglomeration of the abrasive particles in the slurry. After mixing, the abrasive slurry is coated onto at least one side of a porous backing by any conventional technique, such as roll coating, knife coating, die coating, spraying or curtain coating. During coating, some of the abrasive slurry will typically penetrate into the porous backing. The abrasive slurry should not, however, completely seal the porous backing. Finally, the binder precursor in the abrasive slurry is solidified to form the abrasive composite.

The preferred coating technique uses a knurled roll that has between 5 to 30 lines/cm, preferably between 10 to 20 lines/cm. The roll is constructed of a copper sleeve that is chrome-plated after knurling. A doctor blade is used to remove any excess abrasive slurry prior to application onto the porous backing. This results in the abrasive slurry being applied to the backing in a pattern coating with a controlled amount of abrasive slurry being applied to the backing. The thickness of the abrasive composite will typically range between 3 to 30 $\mu$m, preferably between 5 to 15 $\mu$m.

Figure 7:
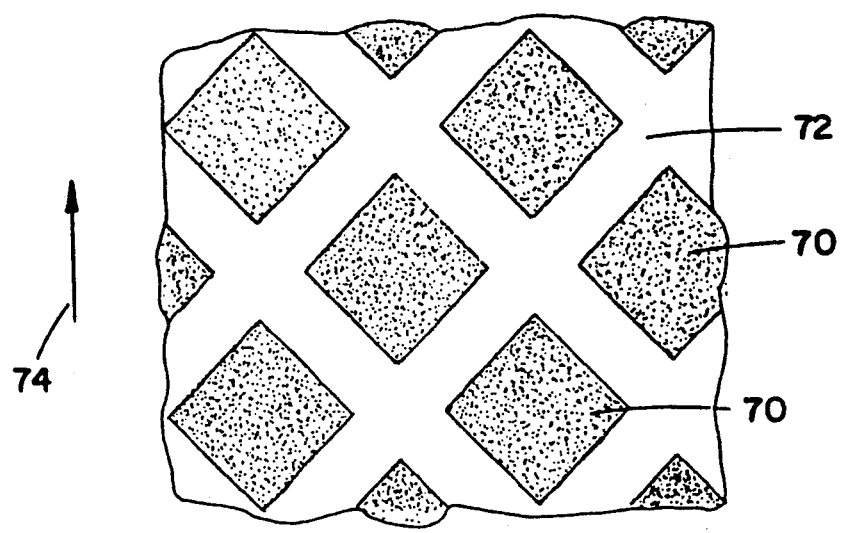
FIG. 7 is an enlarged top view of a portion of an abrasive article for use in the method according to the present invention with a repeating, multi-directional patterned abrasive composite on the backing.

Due to the knurled coating roll, the abrasive composite forms a repeating, multi-directional pattern on the porous backing as depicted in FIG. 7. The pattern provides a discontinuous coating of the abrasive composite on the backing. There are areas where the abrasive composite 70 is present on the backing and areas 72 where no abrasive composite is present, i.e., the porous backing is exposed. It is believed that the discontinuous pattern allows swarf to penetrate into the porous backing and move away from the abrading interface during texturing. As depicted, abrasive coated areas forming a pattern of abrasive composites 70 are preferably positioned so that there are no continuous areas which are not coated with abrasive along a line in the direction of travel 74 of the abrasive article but there are continuous areas which are not coated with abrasive along a line which is at angle with respect to the direction of travel 74 of the abrasive article.

Figure 8:
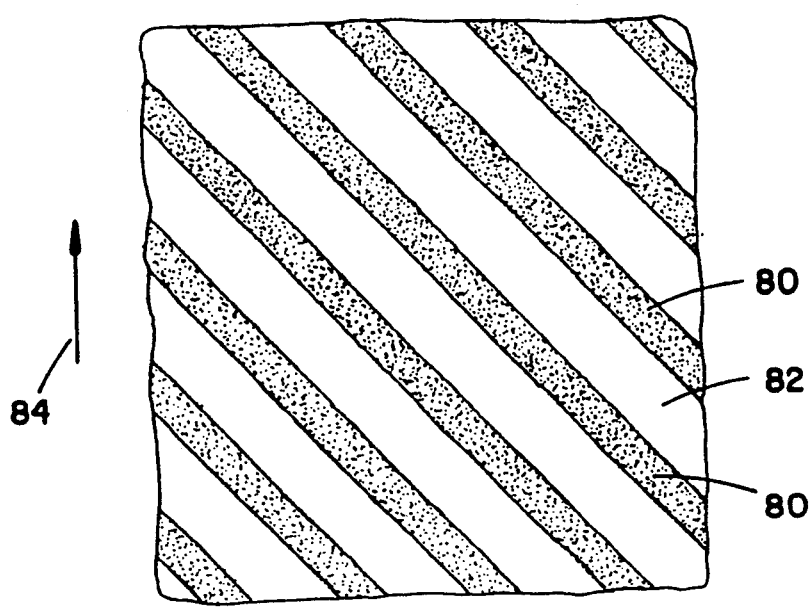
FIG. 8 is an enlarged top view of a portion of an abrasive article for use in the method according to the present invention with substantially parallel rows of abrasive composite set at angle on the backing.

In an alternate embodiment of the abrasive article depicted in FIG. 8, the abrasive composite pattern consists of substantially parallel rows of elongate abrasive composite segments 80 alternating with areas 82 of backing free of abrasive composite. Each elongate abrasive composite segment 80 has a longitudinal axis and preferably positioned on the backing so that the axis is deployed at an angle which is different from the direction of travel 84 of the abrasive article as depicted in FIG. 8.

In addition to the patterns disclosed in FIGS. 7 and 8, it will be understood that many other patterns could be used in forming the abrasive composite on the backing. The primary factors to consider in developing other patterns include the even distribution of the abrasive composite across the backing to provide an evenly distributed pattern of scratches and the amount of backing surface that is free of abrasive composite to allow for removal of swarf from the abrading interface. Other examples of possible patterns and, in addition, other abrasive composites that could be used in the method of the present invention are disclosed in U.S. Pat. No. 4,930,266 and U.S. patent application Ser. No. 07/819,755, filed Jan. 13, 1992, which are hereby incorporated by reference.

Figure 4:
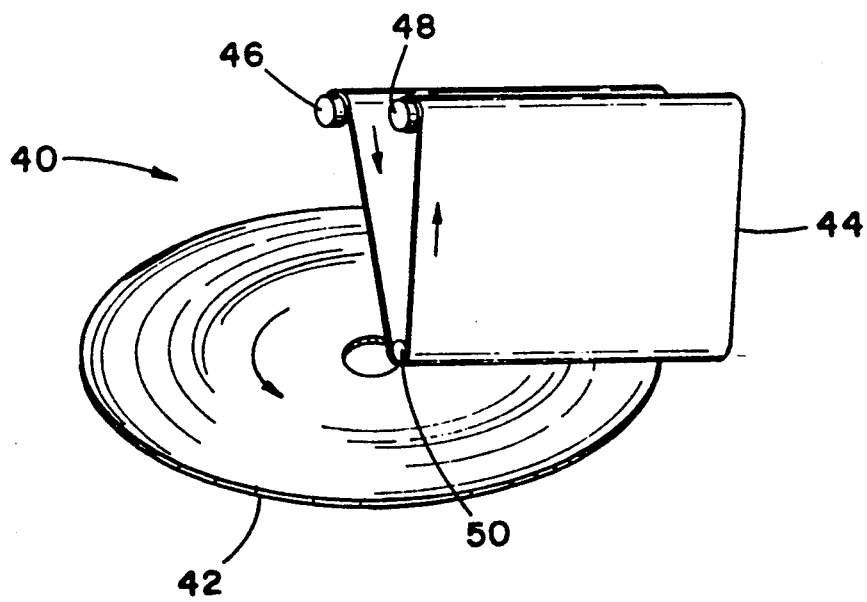
FIG. 4 is a schematic of a texturing apparatus for use with the method of the present invention.

FIG. 4 is a schematic representing a general texturing apparatus 40 for use with the method of the present invention. Although the texturing of only one side of the substrate 42 is depicted, it will be understood that both sides of the substrate 42 will typically be textured simultaneously by separate abrasive articles or by the same abrasive article directed around the substrate by a series of rollers (not shown).

The texturing process is preferably done wet or under a water flood in the presence of a surfactant. Substrate 42 is generally between 50 to 200 millimeters in diameter, usually between 60 to 150 millimeters. The substrate 42 is installed on a machine such as HDF brand machines from the Exclusive Design Company. The machine spins the substrate 42 between about 50 to 700 revolutions per minute (rpm), resulting in a surface speed on the disk of between about 7.5 meters/minute to about 440 meters/minute.

The coated abrasive article 44 of the invention is preferably provided in a continuous roll form having a width between 20 to 60 millimeters, preferably between 25 to about 50 millimeters. The continuous roll of the coated abrasive article 44 is unwound from one station 46 to a second station 48. In between, the abrasive article 44 contacts the metal coating on substrate 42 with the aid of a roller 50 as the substrate 42 rotates. Roller 50 has a preferred diameter of about 50 millimeters and is preferably constructed of an elastomeric material having a shore A durometer of 50.

The force between the coated abrasive 44 and the metal coating on substrate 42 is between 0.1 to 4 kg, preferably between 0.5 and 3 kg, for a contact length of 31.1 millimeters using a rubber roll which has a diameter of 50 millimeters and a shore A hardness value of 50. If the pressure is too high, the resulting surface finish, (Ra) will be too high, i.e., greater than about 0.0070 μm. If the pressure is too low, then the scratch height will be low and surface finish will be too low, i.e., less than about 0.0030 μm.

The preferred method includes oscillating roller 50 in a radial direction relative to the substrate 42 during the abrading process. That radial oscillation ensures that the scratches formed by the abrasive article 44 are not concentric on the substrate 42, but are, instead, substantially circumferential with random crossings.

During texturing, the abrasive article 44 is also indexed at a controlled rate between stations 46 and 48 to provide a known and uniform abrading rate to the metal coating on substrate 42. The indexing speed of the coated abrasive article 44 is between 50 to 400 millimeters/minute, preferably between 150 to 250 millimeters/minute. The combination of the indexing abrasive article 44 and oscillating roller 50 provide the random, substantially circumferentially spaced scratches depicted best in FIGS. 1, 2 and 5.

The rigid substrate 42 is typically cleaned to remove any debris or swarf after texturing. After cleaning, any conventional magnetic coating can be applied over the scratches. In a typical thin-film metal coated rigid magnetic media disk a coating, such as chrome, is applied over a textured nickel/phosphorus coating. An additional coating of a magnetic material is applied over the chrome coating, for example, a CoXY alloy, where Co is cobalt, X can be platinum or tantalum, Y can be chrome or nickel. Finally, a carbon coating is applied over the magnetic coating.

EXAMPLES

The following non-limiting examples will further illustrate the method of the present invention. All parts, percentages, ratios, etc, in the examples are by weight unless otherwise indicated. The following abbreviations are used throughout the examples:

WAO: white aluminum oxide
NB1: A nonwoven backing containing polyester and cellulose fibers, 180 μm thick, commercially available from Hollingsworth & Vose, East Walpde, Mass. under the trade designation HOVOTEX 9915.
MEK: methyl ethyl ketone
PR1: A polyester resin commercially available from Goodyear under the trade designation VITEL PE-200. This polyester resin was 40% in a 50/50 mixture of MEK and toluene.
CA1: A gamma mercaptopropylmethoxysilane coupling agent commercially available from Union Carbide, Danbury, Conn. under the trade designation A-189.
TOL: toluene
ETC: ethylcellulose resin commercially available from Dow Chemical under the trade designation ETHOCEL.
IR1: A polymethylene polyphenyl isocyanate commercially available from Mobay under the trade designation PAPI 135.

General Procedure for Making the Coated Abrasive Article

An abrasive slurry was prepared for each example. The abrasive slurry was coated onto the surface of a porous backing. The knurled roll used for coating had a chrome-plated knurl with 16 lines/cm. A doctor blade was placed above the knurled roll to remove excess abrasive slurry from the knurled roll before printing on the porous backing. The knurled roll was set up such that the lines were at about a 45 degree angle relative to the direction of travel of the porous backing. This coating was done on a continuous basis at a run speed of about 27 meters/minute. The porous backing/abrasive slurry was heated for about three minutes at 120° C. immediately after coating to solidify the binder precursor into binder.

After the coated abrasive article was made it was tested according to one of the test procedures outlined below.

Rigid Disc Texturing Test

The rigid disc texturing test was performed on a rigid disc using the method of the present invention. A Model 800C HDF Rigid Disc Burnisher, manufactured by Exclusive Design Co., San Mateo, Calif. was used. The rigid disc substrate was a nickel/phosphorus plated aluminum disc (95 mm diameter) rotated at 600 rpm.

The abrasive article of the present invention was cut into a 51 mm wide abrasive strip having an extended length. Rolls of the abrasive strip were installed on a tape cassette that had a supply reel with the unused abrasive article and a take-up reel with the used abrasive article. Two sets of abrasive tape cassettes were tested. One cassette was used to texture the top surface of the rigid disc, and one cassette was used to texture the bottom surface of the rigid disc. The rate of feed of the abrasive tape was 42 cm/min.

During the texturing process an aqueous coolant mist was dripped onto a cleaning fabric which was applied to the surface of the rigid disc to transfer the aqueous coolant to the surface of the disk. The aqueous coolant consisted of a 5% solution of RECOOL 85, commercially available from Man-gill Chemical Co.

Two cleaning tape cassettes (Type TJ Cleaning Tape, manufactured by Thomas E. West Co.) were also used in this test. One cassette was used to clean the top surface of the rigid disc, and one cassette was used to clean the bottom surface of the rigid disc.

At the surfaces of the rigid disc, the abrasive tapes and cleaning tapes were passed over a 50 durometer elastomer roller which was oscillated in a radial direction relative to the disk using a mechanical vibrator with approximately 3 to 6 mm of travel. The endpoint of the test was 20 seconds. At the endpoint of the test, the surface of the rigid disc was measured to determine the Ra of each sample.

EXAMPLES 1-3 AND COMPARATIVE EXAMPLE A

This set of examples compared various abrasive slurry formulations for use with the method of the present invention as well as a comparative example (Example A) in which the backing was a sealed polymeric film. The coated abrasives were made according to the procedure outlined above and tested according to Rigid Disc Texturing Test also described above. The test results can be found in Table 1.

The abrasive slurries for all three examples were prepared by thoroughly mixing the following materials in the order listed: 16.3 kg TOL, 15.4 kg MEK, 16.8 kg PR1, 1400 milliliters CA1, 0.45 kg IR1 and 80 kg of WAO. Each abrasive slurry was milled for 1.5 hours in a clean attritor mill that contained glass media on a low speed. A blend of 7.5 kg TOL and 7.5 kg MEK was added to each mixture and the abrasive slurry was mixed for 5 additional minutes. Next, 10.4 kg of a 30% solution of styrene allyl alcohol was added and the abrasive slurry was mixed for 5 additional minutes. Then, 49.9 kg of PR1 was added and the abrasive slurry was mixed for 5 additional minutes. Finally, 3.2 kg of ethylcellulose was added and the slurry was mixed for an additional five minutes. The backing for this example was NB1.

For Example 1, the average size of the abrasive particles was about one µm and the abrasive composite coating weight was 18 g/m$^2$. For Example 2, the average size of the abrasive particles was about two µm and the abrasive composite coating weight was 16.8 g/m$^2$. For Example 3, the average size of the abrasive particles was about three µm and the abrasive composite coating weight was 16.1 g/m$^2$.

Comparative Example A was a 2 µm IMPERIAL ™ Lapping film, Type R3 Coated Abrasive, commercially from 3M Company, St. Paul, Minn. The backing for this product was a sealed polyester film, i.e., the backing was not porous as defined above.

TEST RESULTS

The results of the testing described above for Examples 1-3 and Comparative Example A are displayed in Table 1 below, as well as pictorially in FIGS. 5 and 6.

TABLE 1

| Example | Ra (µm) |
|---------|---------|
| 1 | 0.00265 |
| 2 | 0.00339 |
| 3 | 0.0109 |
| A | 0.0029 |

As discussed above, the preferred range of Ra of the scratches is between about 0.0030 to about 0.0070 µm. Thus, Example 2 and Comparative Example A provided the best results as measured by the Wyko Interferometer.

Figure 5:
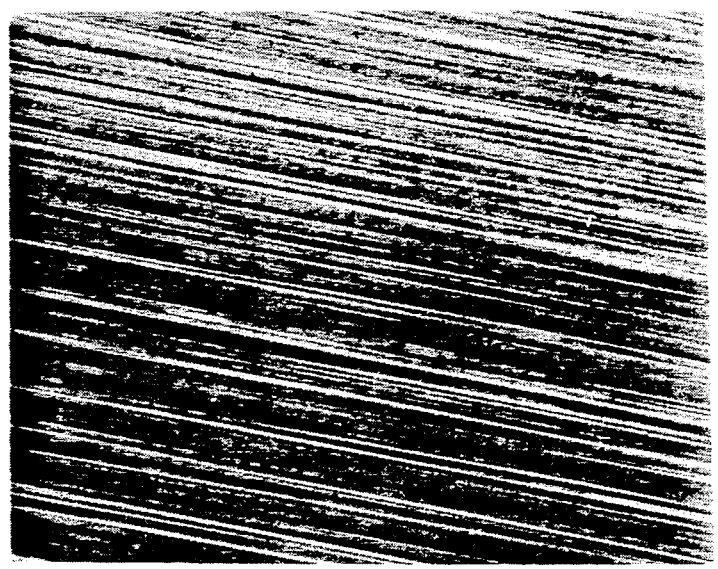
FIG. 5 is a Nomarski Differential Interference Contrast photomicrograph (400×) of a nickel/phosphorus metal coating on a substrate textured according to the method of the present invention.
Figure 6:
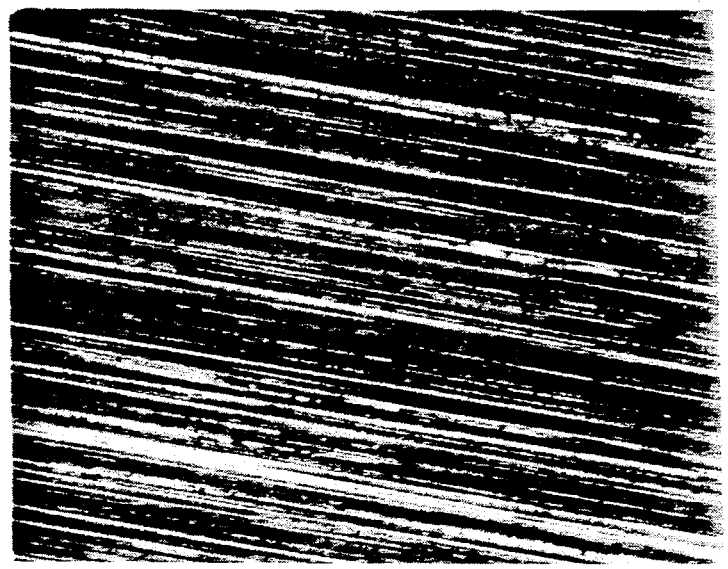
FIG. 6 is a Nomarski Differential Interference Contrast photomicrograph (400×) of a nickel/phosphorus metal coating on a substrate textured using lapping tape with a polymeric film backing according to the prior art.

Referring to FIGS. 5 and 6, FIG. 5 represents Comparative Example A; FIG. 6 represents Example 2. It was evident from the photomicrographs that the disk of FIG. 6, the product of Example 2, had a cleaner, more desirable looking scratch pattern than that of FIG. 5, the product of Comparative Example A, which was produced using an abrasive article having a sealed backing.

In view of the foregoing description, it will be apparent that the method of the invention is not limited to the specific details set forth herein for purposes of illustration, and that various other modifications are equivalent for the stated and illustrated functions without departing from the spirit of the invention and the scope thereof as defined in the appended claims.

We claim:

1. A method of texturing a thin-film metal coated substrate of a magnetic recording media before application of a magnetic coating to said substrate, said method comprising the steps of:
    a) providing a rigid substrate having a metal coating on a surface of said rigid substrate;
    b) providing a porous abrasive article in frictional contact with said metal coating, said porous abrasive article comprising an abrasive composite bonded to a porous backing, said abrasive composite further comprising a plurality of abrasive particles distributed in a binder; and
    c) abrading said metal coating with said porous abrasive article to form scratches in said metal coating.

2. The method of claim 1, wherein said step of providing said porous abrasive article further comprises providing a nonwoven material as said porous backing.

3. The method of claim 2, wherein said porous backing is provided as 2 to 5 layers of nonwoven material.

4. The method of claim 1, wherein said abrasive particles are provided with an average size of about 0.1 to about 10 µm.

5. The method of claim 1, wherein said abrasive particles are provided with an average size of about 0.1 to about 3 µm.

6. The method of claim 1, wherein said abrasive particles provided are comprised of one or more materials selected from the group consisting of fused aluminum oxide, ceramic aluminum oxide, white fused aluminum oxide, heat-treated aluminum oxide, gamma aluminum oxide, chrome oxide, silicon carbide, alumina zirconia, diamond, ceria, cubic boron nitride, and garnet.

7. The method of claim 1, wherein each of said abrasive particles provided are comprised of an abrasive agglomerate.

8. The method of claim 1, wherein said abrasive composite is provided with a gravimetric ratio of said abrasive particles to said binder between about 5:1 to about 1:1.

9. The method of claim 1, wherein said abrasive composite comprises a pattern of abrasive areas on said backing separated by areas on said backing which contain no abrasive particles, said abrasive areas being positioned on said backing so that on a line in one direction there are no continuous areas which are not coated with abrasive, but there are continuous areas which are not coated with abrasive on a line in another direction at an angle with respect to said one direction and said abrading is in said one direction.

10. The method of claim 9, wherein said abrasive composite is provided as a pattern comprising plurality of substantially elongate abrasive areas, each of which has a longitudinal axis wherein adjacent abrasive areas are separated by areas on the backing which contain no abrasive and said abrading is in a direction which is different from the direction of the longitudinal axes of said elongate areas.

11. The method of claim 1, wherein said abrading is accomplished in a liquid environment.

12. The method of claim 1, wherein said step of abrading further comprises oscillating said abrasive article in a direction substantially perpendicular to a direction of travel of said rigid substrate during the abrading.

13. The method of claim 1, wherein said rigid substrate is circular and further wherein said step of abrading further comprises rotating said rigid substrate about its center to for substantially circumferential scratches in said metal coating.

14. The method of claim 13, wherein said step of rotating further comprises moving said substrate at a speed of about 7.5 to about 440 meters per minute at an interface between said metal coating and said porous abrasive article.

15. The method of claim 13, wherein said step of abrading further comprises forming said substantially circumferential scratches with an Ra of between about 0.0030 μm to about 0.0070 μm.

16. The method of claim 13, wherein said step of abrading further comprises forming said substantially circumferential scratches with an Ra of between about 0.0035 μm to about 0.0055 μm.

17. The method of claim 1, further comprising the step of polishing said metal coating to an Ra of about 0.0020 μm or less before said step of abrading is performed.

18. A method of texturing a thin-film metal coated substrate of a magnetic recording media before application of a magnetic coating to said substrate, said method comprising the steps of:
 a) providing a rigid, circular substrate having a metal coating on a surface of said rigid, circular substrate;
 b) providing a porous abrasive article in frictional contact with said metal coating, said porous abrasive article comprising an abrasive composite bonded to only a portion of a porous nonwoven material backing, said abrasive composite further comprising a plurality of abrasive particles distributed in a binder, said abrasive particles having an average size of about 0.1 to about 3 μm; and
 c) abrading said metal coating with said porous abrasive article to form substantially circumferential scratches in said metal coating.

* * * * *

UNITED STATES PATENT AND TRADEMARK OFFICE
CERTIFICATE OF CORRECTION

PATENT NO. : 5,307,593
DATED : May 3, 1994
INVENTOR(S) : Lucker et al.

It is certified that error appears in the above-indentified patent and that said Letters Patent is hereby corrected as shown below:

Col. 13, line 1, "for" should be --form--.

Signed and Sealed this

Twenty-fifth Day of October, 1994

Attest:

BRUCE LEHMAN

Attesting Officer      Commissioner of Patents and Trademarks